United States Patent
Shen et al.

(10) Patent No.: US 9,015,088 B2
(45) Date of Patent: Apr. 21, 2015

(54) METHOD AND SYSTEM FOR PSYCHOLOGICAL ANALYSIS BY FUSING MULTIPLE-VIEW PREDICTIONS

(71) Applicant: Palo Alto Research Center Incorporated, Palo Alto, CA (US)

(72) Inventors: Jianqiang Shen, Santa Clara, CA (US); Oliver Brdiczka, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 249 days.

(21) Appl. No.: 13/663,747

(22) Filed: Oct. 30, 2012

(65) Prior Publication Data
US 2014/0122383 A1    May 1, 2014

(51) Int. Cl.
| | | |
|---|---|---|
| G06G 7/00 | (2006.01) | |
| G06Q 10/00 | (2012.01) | |
| A63F 13/30 | (2014.01) | |
| G06Q 50/10 | (2012.01) | |

(52) U.S. Cl.
CPC ............... *G06Q 50/10* (2013.01); *A63F 13/12* (2013.01); *A63F 2300/5506* (2013.01); *A63F 2300/556* (2013.01); *A63F 2300/558* (2013.01)

(58) Field of Classification Search
None
See application file for complete search history.

(56) References Cited

U.S. PATENT DOCUMENTS

| 8,117,054 B2 | 2/2012 | Brdiczka et al. |
| 2004/0210661 A1* | 10/2004 | Thompson ................... 709/228 |
| 2007/0048706 A1* | 3/2007 | Tan ............................... 434/236 |
| 2007/0192106 A1 | 8/2007 | Zilca |
| 2008/0033826 A1* | 2/2008 | Maislos et al. .................. 705/14 |
| 2008/0201199 A1 | 8/2008 | Armstrong et al. |
| 2009/0254417 A1* | 10/2009 | Beilby et al. .................... 705/10 |
| 2011/0179116 A1 | 7/2011 | Solomon et al. |
| 2011/0276408 A1 | 11/2011 | Toole |
| 2012/0142429 A1 | 6/2012 | Muller |
| 2012/0284080 A1* | 11/2012 | De Oliveira et al. ......... 705/7.29 |
| 2013/0073390 A1* | 3/2013 | Konig et al. ............... 705/14.54 |
| 2014/0074920 A1* | 3/2014 | Nowak et al. ................. 709/204 |

OTHER PUBLICATIONS

Shen, Jianqiang et al. "Inferring Personality of Online Gamers by Fusing Multiple-View Predictions", 2012.

* cited by examiner

*Primary Examiner* — Alan Chen
(74) *Attorney, Agent, or Firm* — Shun Yao; Park, Vaughan, Fleming & Dowler LLP

(57) ABSTRACT

One embodiment of the present invention provides a system for predicting a personality trait. During operation, the system initially obtains personality data associated with users. The system collects sample data associated with the users. Next, the system trains a predictor with the collected sample data and the personality data. Then, the system collects data associated with a particular user, and generates a personality trait score for the particular user by using the predictor to analyze the particular user's collected data.

19 Claims, 8 Drawing Sheets

METHOD AND SYSTEM FOR PSYCHOLOGICAL ANALYSIS BY FUSING MULTIPLE-VIEW PREDICTIONS

STATEMENT OF GOVERNMENT-FUNDED RESEARCH

This invention was made with U.S Government support under Contract No. W911NF-11-C-0216(3729) awarded by the Government Army Research Office. The U.S. Government has certain rights in this invention.

BACKGROUND

1. Field

This disclosure is generally related to psychological analysis. More specifically, this disclosure is related to a method and system for predicting personality by combining predictions from predictors generated from multiple data sources.

2. Related Art

The ability to reliably predict a person's personality affects many commercial and personal activities. For example, if social gaming service providers know a player's personality well, they can provide better targeted advertisements for virtual goods. If an online dating service provider knows a candidate's personality well, they can match the candidate with a higher chance of success. In a high-stakes work environment, if an employer finds a significant mismatch between an employee's personality profile and the nature of the job, the employer can take measures to mitigate or avoid risks.

In one approach, to profile a personality, an analyst can request a person fill out a detailed survey. The analyst can determine the person's personality profile using the answers. For example, the International Personality Item Pool (http://ipip.ori.org/ipip/) provides a collection of such survey items. The analyst can then predict the person's personality according to the Five Factor Model's personality traits. These traits are extraversion (outgoing, gregarious, energetic vs. reserved, shy, quiet), agreeableness (friendly, caring, cooperative vs. suspicious, antagonistic, competitive), conscientiousness (organized, self-disciplined, dutiful vs. careless, spontaneous, easy-going), neuroticism (calm, secure, confident vs. nervous, sensitive, vulnerable), and openness (abstract thinkers, imaginative, intellectually curious vs. down-to-earth, conventional, traditional). The person's personality is measured with a real number along each of the personality traits.

In another approach, a script can guide a person to select attributes from a group consisting of saturated, whitened, grayed, and blackened. This approach then analyzes the elements to identify personality characteristics. Like the survey method, this approach also requires explicitly requesting information from the subject.

In yet another approach, an analyst collects user information, and creates behavioral profiles for users based on the collected information. This approach suggests utilizing pre-existing customer data, interviews, or questionnaires, to create customer behavioral profiles. Unfortunately, this approach also explicitly requests information from users to build personality profiles, which is burdensome and in many cases is not practical.

SUMMARY

One embodiment of the present invention provides a system for predicting a personality trait. During operation, the system initially obtains personality data associated with users. The system collects sample data associated with the users. Next, the system trains a predictor with the collected sample data and the personality data. Then, the system collects data associated with a particular user, and generates a personality trait score for the particular user by using the predictor to analyze the particular user's collected data.

In a variation on this embodiment, training the predictor further includes collecting text data; and training the predictor based on the collected text data.

In a further variation, the text data includes one or more of a character name associated with an online game, a username associated with an online account, a writing sample, or an e-mail address.

In a further variation, training the predictor further includes referencing a sentiment dictionary and counting a number of words in the text data with positive sentiment.

In a variation on this embodiment, training the predictor further includes collecting social data; and training the predictor based on the collected social data.

In a variation on this embodiment, the social data includes a social network graph constructed by analyzing one or more of e-mail communication, chat history, and/or participation in game guilds.

In a variation on this embodiment, training the predictor further includes collecting behavior data; and training the predictor based on the collected behavior data.

In a further variation, the behavior data includes one or more of achievement ratio, activity logs from an online game, behavior data from an online dating service, and/or work pattern data of the user.

In a variation on this embodiment, the system combines personality trait scores from multiple predictors to generate an overall personality trait score.

In a variation on this embodiment, training the predictor further includes collecting text, social, and/or behavior data, and training the predictor based on the collected text, social, and/or behavior data.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of predicting personality by combining predictions from predictors generated from different data sources.

A personality prediction system can predict a user's offline personality by analyzing online data related to the user, without requiring the user to perform time-consuming tasks such as filling out a lengthy questionnaire. The system initially surveys a control group of people about their personality and online names or game characters. The system collects online text, social, and behavior data associated with the online names or characters for the control group. The system trains and generates predictors based on the collected data and personality surveys. Such predictors can be, for example, regression trees. Subsequently, the system can analyze a user's text, social, and behavior data using the predictors, and generate personality trait scores for the user with the predictors. The system combines the personality trait scores to create an overall personality prediction.

Text data is information related to a user's choice of names (e.g., username, email address, or game character name), writing style (e.g., email writing), and other textual data entered by (and/or otherwise associated with) the user. Social networking data is information related to the user's online interaction and connections with other people. Behavior data is information related to any other online actions, properties, and possessions associated with the user.

The illustrated examples use data collected from World of Warcraft® from Blizzard Entertainment®. World of Warcraft® is an online game with millions of players. The players create online characters that interact with each other. Their characters can attain skills, increase skill level and experience, and join guilds to complete quests and acquire prized virtual items. The personality prediction system can train predictors with the players' text, social, and behavior data associated with the players' characters. For each type of data, the system trains a predictor for each personality trait. The system can predict a personality trait score for any user using a predictor. The system combines personality trait scores from the predictors to generate an overall personality prediction.

Overview of Predicting Personality

Figure 1:
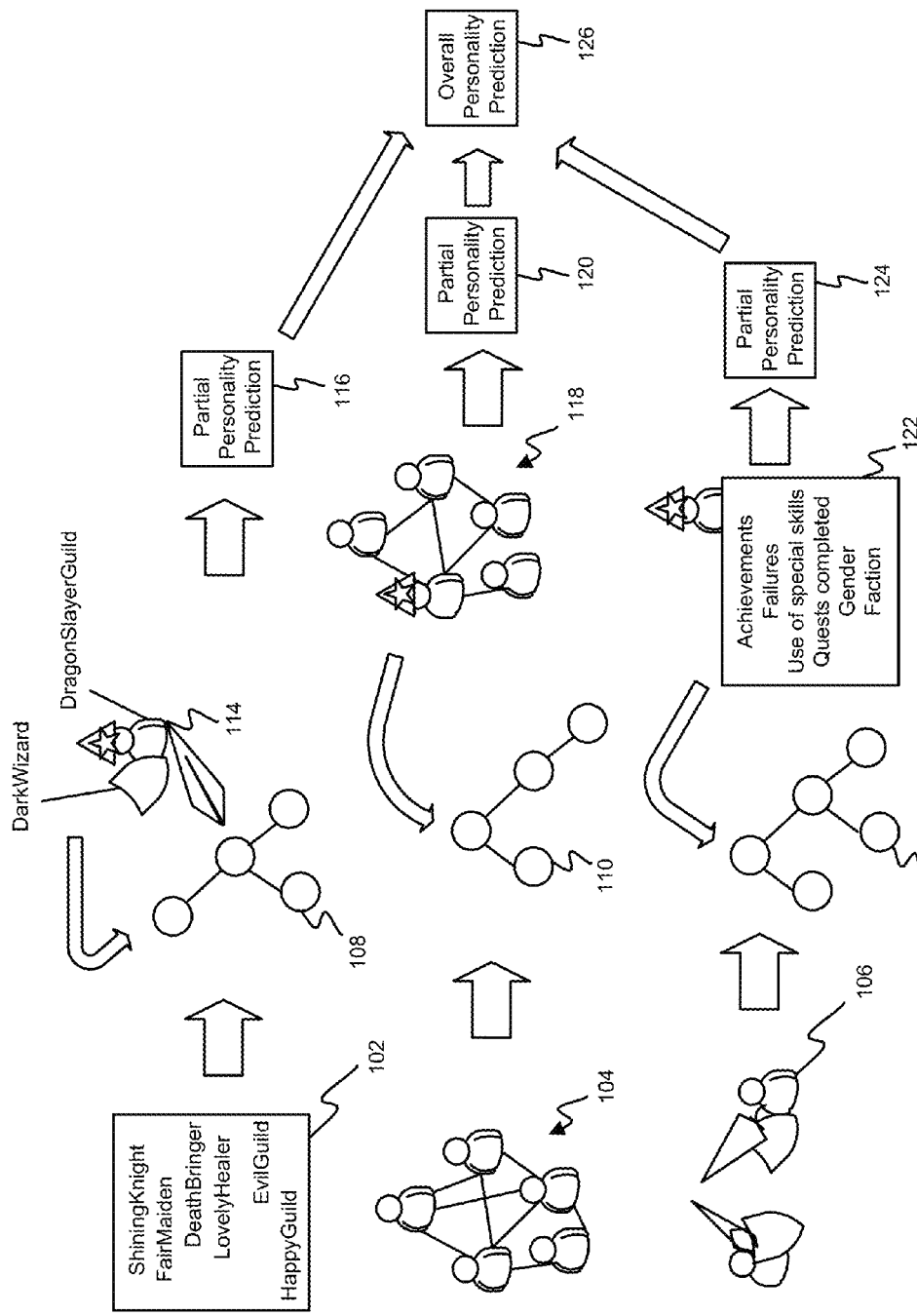
FIG. 1 presents a diagram illustrating an overview of a process for predicting personality, in accordance with an embodiment of the present invention.

FIG. 1 presents a diagram illustrating an overview of a process for predicting personality, in accordance with an embodiment of the present invention. In FIG. 1, a personality prediction system obtains text data 102, social data 104, and behavior data 106 to train text predictors 108, social predictors 110, and behavior predictors 112, respectively. The system can obtain the text, social, and behavioral data from text, social, and behavior sources, respectively.

Text data 102 includes, for example, names of players (e.g., character names) in an online game. Social data 104 includes, for example, a graph of the social relationships between online players. Behavioral data 106 includes, for example, players' achievements in different tasks such as battles with other players or battles with monsters.

The system can train multiple predictors for each type of data, one predictor for each personality trait or multiple personality traits. The system may separately train each predictor. For example, the system may train predictors that include an extraversion predictor and a conscientiousness predictor for text data. Under the Five Factor Model, each of predictors 108, 110, and 112 represent five different predictors corresponding to five personality traits. Thus, text predictors 108 actually represent multiple different predictors, one for each personality trait. Also, social predictors 110 and behavior predictors 112 also each represent five different predictors in an implementation utilizing the Five Factor Model.

The predictors can be regression trees. A regression tree is one type of decision tree. A decision tree is a flowchart-like structure. In a regression tree, the internal non-leaf nodes represent a test on a feature (e.g., number of monsters killed). A feature is a variable that the system may analyze in predicting a personality trait score. The regression tree is powerful in that the algorithm identifies the features that are predictive of a personality trait (e.g., greater number of monsters killed may lead to higher aggressiveness score).

In a regression tree, the branches from the each node represent outcomes of the test at the node (e.g., if >100 monsters killed, pick the left branch; if <100 monsters killed, pick the right branch). Each terminal (e.g., leaf) node is associated with a real number value (e.g., the score of a personality trait).

The system computes a personality trait score for the user by traversing down the regression tree. At each node, the system chooses a left or right branch based on a feature such as the number of monsters killed, the number of friends that the user has, and/or the number of positive sentiment words. (A sentiment word indicates an opinion and/or emotion.) The system continues traversing down the tree until the system arrives at a leaf node that indicates a real number score for a personality trait. Note that a regression tree can also have multiple branches connected to nodes, leaf nodes can be associated with multiple personality trait scores, and nodes may be associated with multiple features.

The system can generate regression trees using a standard regression tree algorithm. The system can also apply other machine learning techniques such as support vector machines and Bayes networks.

The system analyzes data for a user 114 (shown in FIG. 1 as represented by a character from an online game) with the predictors 108, 110, and 112 to create predictions. For example, the system uses predictors 108 to analyze the character name of "DarkWizard" and the name of the guild that user 114 belongs to (e.g., "DragonSlayerGuild") to generate a partial personality prediction 116 for user 114. The system also uses predictors 110 to analyze the social relationships 118 for user 114 to generate a partial personality prediction 120. Further, the system uses predictors 112 to analyze the traits and activities 122 (e.g., achievements, failures, use of special skills, etc.) performed by user 114, in order to generate a partial personality prediction 124. The system combines the partial predictions to create an overall personality prediction 126.

Note that the techniques described herein can also apply to personality models with greater than five personality traits. Embodiments of the present invention are not limited to the personality traits in the Five Factor Model. For example, various implementations may also include organizational deviance or aggressiveness as a personality trait.

Although the disclosed embodiments are discussed with respect to online gaming, embodiments of the present invention also operate with data from other contexts, such as data from online dating or work office environments. Embodiments of the present invention are not limited to data sources from any particular context.

Training Partial Predictors to Create an Overall Prediction

Figure 2A:
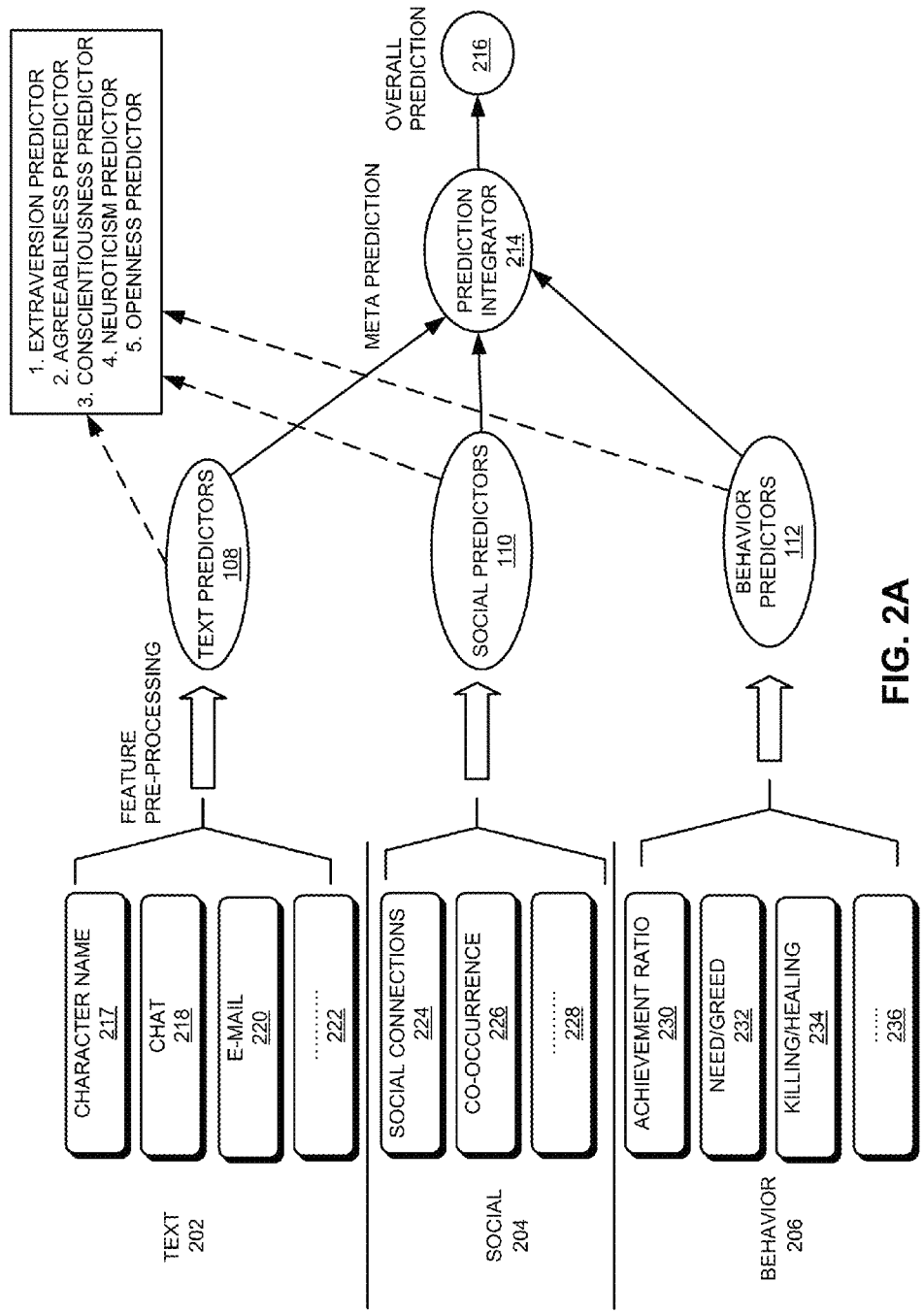
FIG. 2A presents a diagram illustrating training partial predictors to create an overall prediction, in accordance with an embodiment of the present invention.

FIG. 2A presents a diagram illustrating training partial predictors to create an overall prediction, in accordance with an embodiment of the present invention. In FIG. 2A, the personality prediction system utilizes data from text sources 202, social sources 204, and behavior sources 206 to train text predictors 108, social predictors 110, and behavior predictors 112, respectively. Text sources 202 provide textual information that the system can use as features. Text data includes, for example, a character name 217, chat data 218, e-mail data 220, and/or other text data 222. Social sources 204 provide data that includes, for example, social connections 224, co-occurrence 226, and/or other social data 228. Behavior sources 206 provide data that includes, for example, an achievement ratio 230, need/greed 232, killing/healing 234, and/or other behavior data 236.

The system analyzes data for a user with the predictors 108, 110, 112 to create partial predictions. A prediction integrator 214 then combines the three partial predictions (shown as "meta prediction" in FIG. 2A) to create an overall prediction 216. Prediction integrator 214 may combine the predictions by computing the average, weighted average, or any other method for combining the scores. For example, to generate an overall aggressiveness score, prediction integrator 214 may combine an aggressiveness score output from each of the text, social, and behavioral predictors for aggressiveness. In some embodiments, the system combines the predictions from each predictor through linear regression.

In some embodiments, the system can also combine text, social, and behavior data to create predictors. A predictor may also test for any combination of text, social, and/or behavior data in the nodes. Furthermore, the system may also generate multiple regression trees for subcategories in each type of data. For example, the system may train a regression tree for e-mail addresses, and another regression tree for user names. The system may also train a regression tree for a combination of e-mail addresses and user names, and for any other data.

Text Content

The system analyzes text content to predict personality. A user's personality can be reflected in the way the user chooses a user name or writes informal documents such as chat messages and emails. A user usually chooses a user name/e-mail address appealing to him/her after some careful thinking User names and e-mail addresses contain very rich information about a user's personality. The choice of words and usage of such words in text messages and e-mails also provides insight into a person's personality.

For online gaming, such text content includes, for example, character names, names of joined guilds, and chat messages. Character names include the names of characters used by players in an online game (e.g., "ShiningKnight"). Chat data includes content from players' chat messages. For online dating, text content includes, for example, user names, self-description and chat messages. For work office environments, text content includes, for example, sent emails, SMS messages and transcriptions of phone conversations.

To construct predictive features from text content, the system can apply three strategies. The first strategy is to analyze sentiment with a sentiment dictionary. Sentiment analysis involves identifying positive and negative opinions and/or emotions in writing. A sentiment dictionary is a compilation of words and phrases that indicate such opinions and/or emotions. That is, entries in a sentiment dictionary may have sentimental polarity indicating positive or negative feelings. The system can use the sentiment dictionary to construct sentiment-related features. Such features include the number/frequency of positive/negative/neutral words in the text, the number/frequency of adjective/adverb/noun/verb (or any other part of speech) sentiment words, and the number/frequency of strongly/weakly subjective words. A word that is subjective in most contexts is considered strongly subjective, and words with only certain subjective usages are considered weakly subjective. Note that the features may also include the number/frequency of strongly positive or strong negative words.

The second strategy is to check customized keyword lists. The system can construct features by checking if the text (e.g., character name) contains any keyword from the lists. Such lists are constructed based on context, e.g., depending on whether the text is extracted from online gaming, online dating, or work environment. The lists can contain the keywords within context (e.g., class names, role names, regions, etc) and include frequently encountered patterns (e.g. frequently detected bigrams, trigrams etc). A bigram is a sequence of two elements (e.g., alphabet letters), such as "th" in theory or thought. A trigram is a sequence of three elements (e.g., three alphabet letters "ple" in apple or trample)

The system may perform n-gram analysis, which uses sliding window character sequences to aid classification. To capture hidden patterns in character and guild names, the system constructs n-grams from names. An n-gram is a subsequence of n letters from a given sequence. For example, for a character name of four letters, such as "ABCD," the bigrams are "AB," "BC," and "CD."

Finally, the system can also construct features related to writing styles. This includes determining whether a message begins with a greeting, the frequency of "you," "I," "we," "he," the frequency of dot, question, and escalation marks, distribution of word difficulties, and average length of sentences.

The system builds a personality predictor for each personality trait using these text-based features. In one embodiment, the system can build regression tree predictors. The system can also build the predictor using other machine learning methods such as support vector machines and Bayes networks.

Social Content

The system can also analyze social data to predict personalities. The system initially builds graphs representing social networks for the surveyed population using social data (e.g., character interaction data from the online game). The system then trains a predictor for each personality trait using the social network graphs. For example, the system may train a predictor for the conscientiousness personality trait. In some embodiments, the system can also train a predictor for multiple personality traits. Then, in order to predict the personality of a user, the system builds a social network graph based on social data for the user. The system analyzes the user's social graph characteristics (e.g., a user's position in a guild and/or the user's web of friends) with the predictors. The output from each of the predictors is a real number indicating a personality trait score.

Social network graphs have graph characteristics such as degree centrality, betweenness centrality, and closeness centrality. Degree centrality is the number of links connected to a vertex. For example, a user with certain personality traits (e.g., high extraversion and agreeableness) is more likely to be socially active with greater numbers of links in a social network graph. Vertices located on many shortest paths between other vertices have higher betweenness than those that do not. Vertices that tend to have short geodesic distances to other vertices in the graph have higher closeness centrality. The geodesic distance is the number of edges in a shortest path connecting two vertices in a graph. Closeness is also the inverse of farness, and the farness of a node is the sum of distances to all other nodes.

Figure 2B:
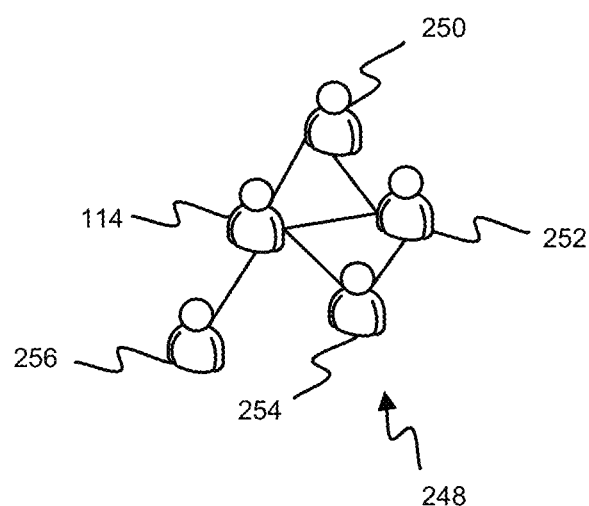
FIG. 2B presents a diagram illustrating an exemplary social network graph, in accordance with an embodiment of the present invention.

FIG. 2B presents a diagram illustrating an exemplary social network graph 248, in accordance with an embodiment of the present invention. In FIG. 2B, user 114 is linked to four people, which are users 250, 252, 254, and 256. The system may link users 250, 252, 254, and 256 to user 114 because, for example, the number of e-mails that user 114 sends to users 250, 252, 254, and 256 exceeds a predetermined threshold number of e-mails. Thus, the degree centrality of user 114 is four, since user 114 is linked to four other people in the social network graph.

The system can create a social network graph based on a user's activities in online gaming, online dating, and/or work office environments. For online gaming, the system can use a heuristic to build social network graphs. If two characters are observed playing for the same guild, at the same location, and at the same time for more than a predetermined threshold frequency, the system adds a link between those two characters in the social network graph.

For online dating, the system can build a social network graph by checking if two users have added each other as friends. In work office environments, the system can construct a social network graph by analyzing email communication and chat history. The system can add a link between two persons if the number of emails between the two persons is greater than a predetermined threshold, or if the number of chats is greater than a predetermined threshold.

The system can also enhance the social features by analyzing co-occurrence information 226. Co-occurrence information is data that shows the user likes to interact with other people. For example, a socially active user is likely to frequently appear in a crowded place. For online gaming, for each character, the system can determine the co-occurrence information by counting the number of characters observed in the same guild and the same zone at his/her play session. For online dating, for each user, the system can determine the co-occurrence information by counting the number of users in his/her chat room and the number of messages he/she sends out every day. For work office environments, the system can determine the co-occurrence information by counting the number of emails and messages the user sends and receives every day. The system then computes the maximum values, minimum values and histograms from such co-occurrence information to use as features.

Behavior Content

The system can also collect user behavior data 106 to train predictors. Different people choose different approaches to achieve their goals in online gaming/dating/work, leading to different behaviors. Online gaming and dating services usually have detailed logs regarding a user's activities. The system can utilize such logs to construct features for analysis. The system can analyze the activities with the predictors to obtain personality trait scores.

For online gaming, typical behavior features include 1) ratio of achievements from different tasks (e.g., quests, exploration, PlayerVsPlayer, dungeons, professions), 2) achievements from group tasks (e.g., 10-man dungeon goals, 25-man dungeon goals), 3) histograms of different failures (e.g., raids, falling, fatigue, drowning), 4) number of times switching ability sets, 5) number of times performing special skills (e.g., summon, portal, hearthed), 6) distribution of emotes (e.g., hug, "LOL"), 7) equipments and pets (e.g., Justice Badge, Lion Sword), 8) distribution of different ways to split a trophy (e.g., need/greed roll where a player indicates if the player needs an item or if the player is simply greedy to get the item after a battle), 9) number of times playing in different scenarios (e.g., arenas, duels, battlefield), 10) number of wins in different scenarios, and 11) choices in the game, such as faction (typically a game divides characters into several factions, such as alliance and horde), virtual gender, race (a character can choose from human, elf, dwarf, etc.), and class (a class corresponds to a set of skills, such as priest, warrior, or hunter).

For online dating, typical behavior features include 1) frequency of the user logging into the service, 2) frequency of performing search profiles, 3) frequency of online chatting, 4) frequency of sending out friend invitations, 5) frequency of sending out messages, 6) distribution of emotes (e.g., hug, kiss, "LOL"), 7) frequency of updating personal profiles, and 8) personal information, such as gender, race, region and personal interest.

For work office environment features, the system records a sequence of work steps of the worker for a predetermined period of time, and extracts a number of temporal patterns ("T-patterns") from the sequence of work steps. T-patterns are recurrent events that occur within a similar temporal configuration or critical interval. Based on the extracted T-patterns, the system calculates T-pattern statistics. The recorded information includes a user's computer use (e.g., running an application on a computer or opening and closing a window on the computer) and recorded visions (e.g., face-to-face communications between workers, images on a computer screen). The system can also utilize information that might affect a user's behavior, such as gender, job position, responsibilities, and position in a company hierarchy, as features. Additional details are discussed in U.S. patent application Ser. No. 12/622,942, entitled "Method for estimating task stress factors from temporal work patterns," which is incorporated by reference herein.

To combine the above listed features into a predictor, a human analyst can hand-design a Bayesian network or the system can learn a Bayesian network. The system can also apply other machine learning methods such as regression trees to combine the features into a predictor.

Exemplary Process for Predicting Personality

Figure 3:
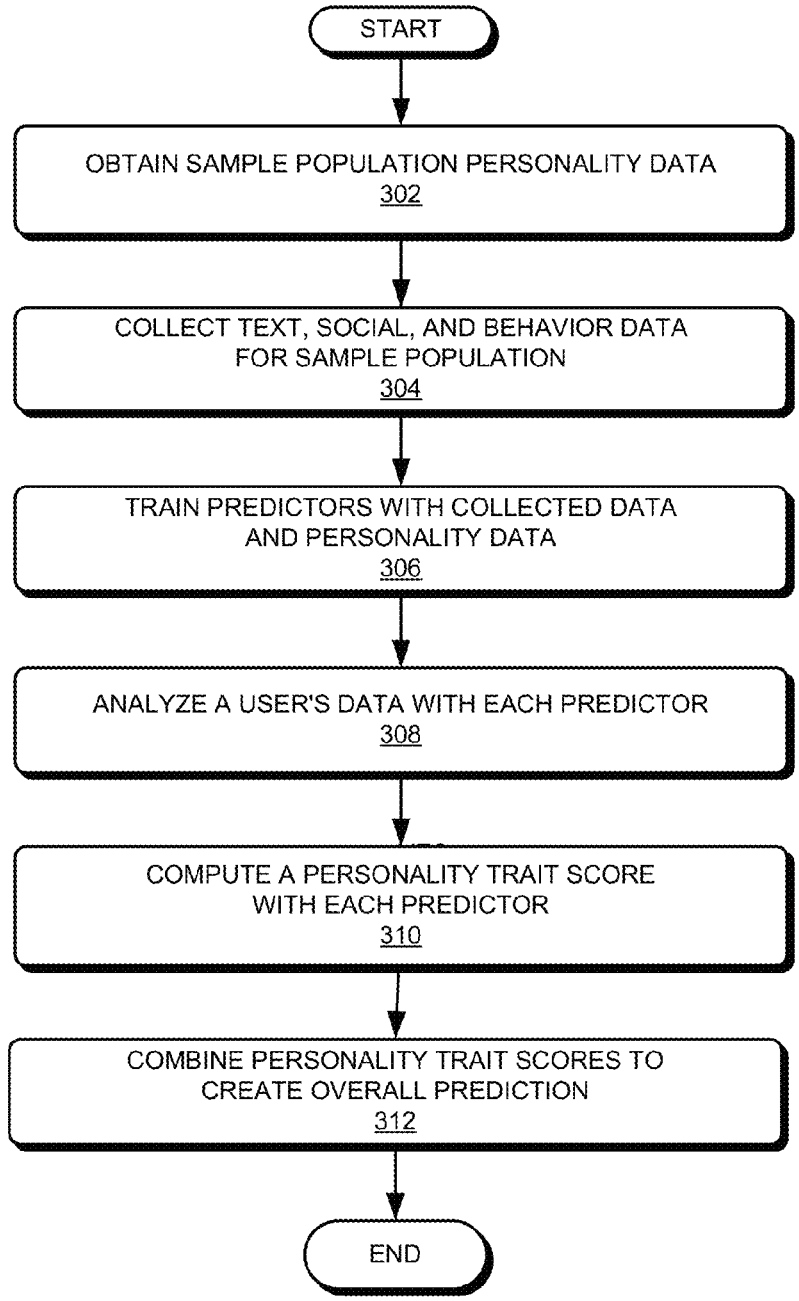
FIG. 3 presents a flowchart illustrating an exemplary process for predicting personality, in accordance with an embodiment of the present invention.

FIG. 3 presents a flowchart illustrating an exemplary process for predicting personality, in accordance with an embodiment of the present invention. During operation, the system initially obtains personality information from a sample population (operation 302). The system uses the information to train predictors. For example, the system may send a survey of personality traits to a number of users. For online gaming, the system may also request a list of characters representing the users in the online game. The users can complete a web-based (or some other) survey to provide their demographic and personality information. The users rate themselves on a scale with respect to the personality traits. The system may also compute relative, scaled measurements of the surveyed population's personality traits for use in training the predictors.

Next, the system collects text, social, and behavioral data from text sources 202, social sources 204, and behavior sources 206 (operation 304). For example, with online gaming, the system uses character names to retrieve the users' logged activities. The system then trains the respective predictors using personality trait measurements from the survey results and the collected data (operation 306).

Subsequently, the system analyzes a user's data with each predictor (operation 308). For example, the system analyzes text data with text predictors 108, social data with social predictors 110, and behavior data with behavior predictors 112. The system computes, using each predictor, a personality trait score (operation 310). For example, the system can receive a neuroticism trait score from each of the predictors 108, 110, and 112. The system then combines the personality trait scores for each personality trait to generate an overall personality prediction (operation 312).

Exemplary System for Predicting Personality

Figure 4:
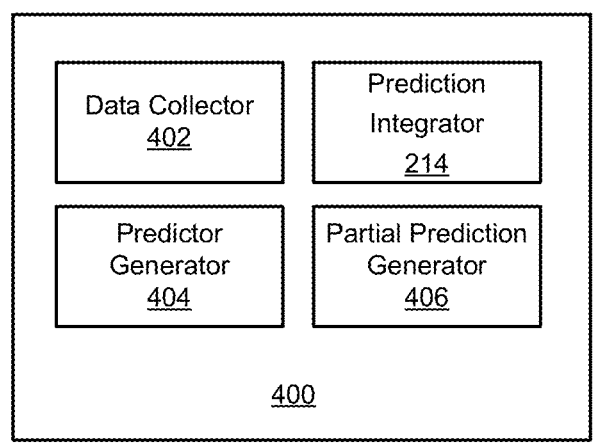
FIG. 4 presents a diagram illustrating an exemplary system for predicting personality, in accordance with an embodiment of the present invention.

FIG. 4 presents a diagram illustrating an exemplary system for predicting personality, in accordance with an embodiment of the present invention. An exemplary personality prediction system 400 includes a data collector 402, a predictor generator 404, a partial prediction generator 406, and a prediction integrator 214. Data collector 402 collects text, social, and behavioral data from their respective sources. Predictor generator 404 trains predictors based on the collected data. For example, predictor generator 404 may train three regression trees that each output a neuroticism trait score. Each of the three regression trees may be trained based on one of the text, social, or behavior data, respectively.

Partial prediction generator 406 analyzes user data with the predictors to generate personality predictions. For example, partial prediction generator 406 may generate a text data-based partial personality prediction for neuroticism by processing a user's text data with a regression tree for neuroticism.

Prediction integrator 214 combines the generated personality predictions to produce an overall personality prediction. For example, prediction integrator 408 can combine the three neuroticism trait scores to produce an overall prediction for the user's neuroticism personality trait.

Although the diagram illustrates components of an exemplary personality prediction system, embodiments of the present invention are not limited to the design, structure, or functionality illustrated in FIG. 4. Other embodiments may arrange the assignment of functionality to the components in different ways. Further, the illustrated components may also perform additional functionality beyond that which is discussed herein.

Exemplary Predictors

Figure 5A:
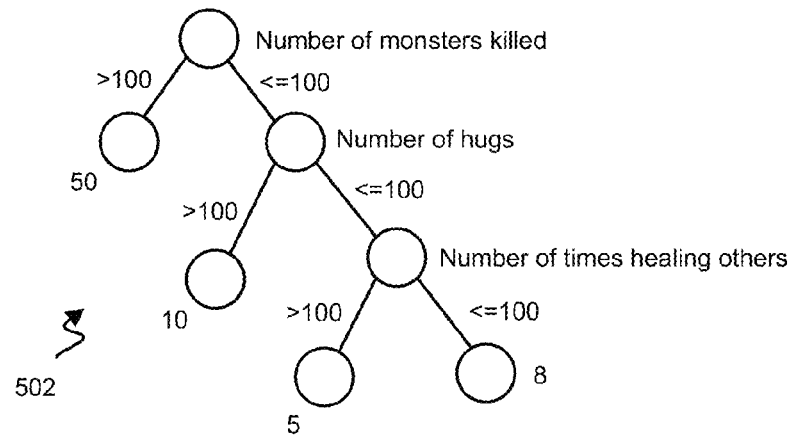
FIG. 5A presents a diagram illustrating an exemplary aggressiveness predictor, in accordance with an embodiment of the present invention.

FIG. 5A presents a diagram illustrating an exemplary aggressiveness predictor, in accordance with an embodiment of the present invention. The system can train an aggressiveness predictor 502 from behavior data, in one example. In FIG. 5A, aggressiveness predictor 502 outputs an aggressiveness score of 50 if user 114 kills more than 100 monsters. If user 114 kills less than or equal to 100 monsters, and user 114 gives more than 100 hugs, then the aggressiveness score is 10. If user 114 kills less than or equal to 100 monsters, hugs less than or equal to 100 times, and heals others more than 100 times, then the aggressiveness score is 5. Finally, if user 114 kills less than or equal to 100 monsters, gives less than or equal to 100 hugs, and heals others less than or equal to 100 times, then the aggressiveness score is 8.

Figure 5B:
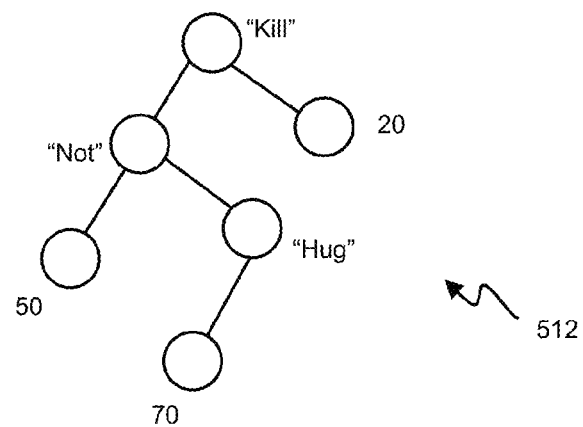
FIG. 5B presents a diagram illustrating an exemplary openness predictor, in accordance with an embodiment of the present invention.

FIG. 5B presents a diagram illustrating an exemplary openness predictor, in accordance with an embodiment of the present invention. The system can train an openness predictor 512 from text data, in one example. In FIG. 5B, openness predictor 512 outputs an openness score of 20 if a character name includes the word "kill." The openness score increases to 50 if the character name also includes the word "not" (e.g., "MeNotKill,"). The openness score increases to 70 if the character name also includes the word "hug" (e.g., "HugNotKill"). Note that although the illustrated example is discussed with respect to a character name, various embodiments may also include regression trees that analyze e-mail addresses, screen names (e.g., names used on dating websites or other online forums), or any combination thereof. Furthermore, although FIG. 5B illustrates a regression tree analyzing a single word at each node, in some implementations, regression trees can analyze any combination of words at each node.

Figure 6:
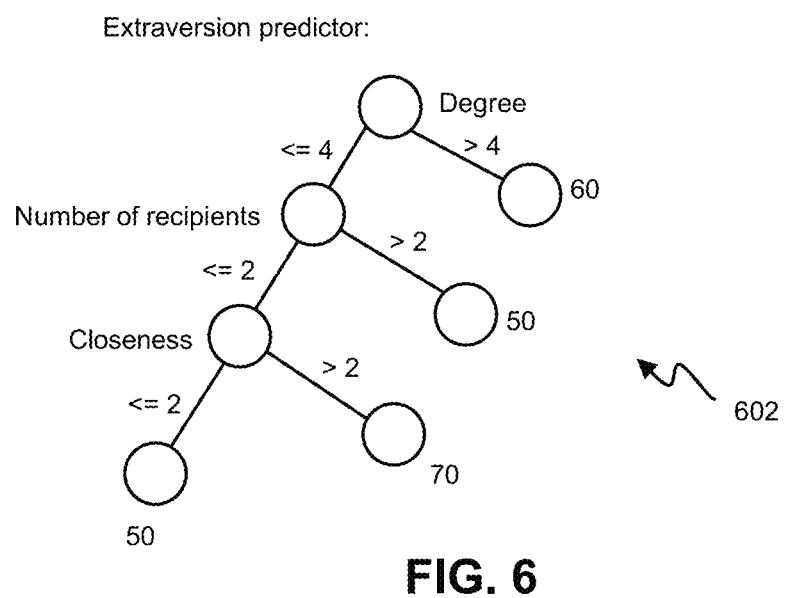
FIG. 6 presents a diagram illustrating an exemplary extraversion predictor, in accordance with an embodiment of the present invention.

FIG. 6 presents a diagram illustrating an exemplary extraversion predictor, in accordance with an embodiment of the present invention. The system can train an extroversion predictor 602 from social data, in one example. In FIG. 6, extraversion predictor 602 outputs an extraversion score of 60 if a degree centrality is greater than 4. Extraversion predictor 602 outputs an extraversion score of 50 if the degree centrality is less than or equal to 4 but the number of recipients of e-mail from user 114 is greater than 2. Extraversion predictor 602 outputs an extraversion score of 70 if the degree centrality is less than or equal to 4, the number of recipients of e-mail is less than or equal to 2, and closeness centrality is greater than 2. Extraversion predictor 602 outputs an extraversion score of 50 if the degree centrality is less than or equal to 4, the number of recipients of e-mail is less than or equal to 2, and the closeness centrality is less than or equal to 2.

An Exemplary Computer System for Predicting Personality

Figure 7:
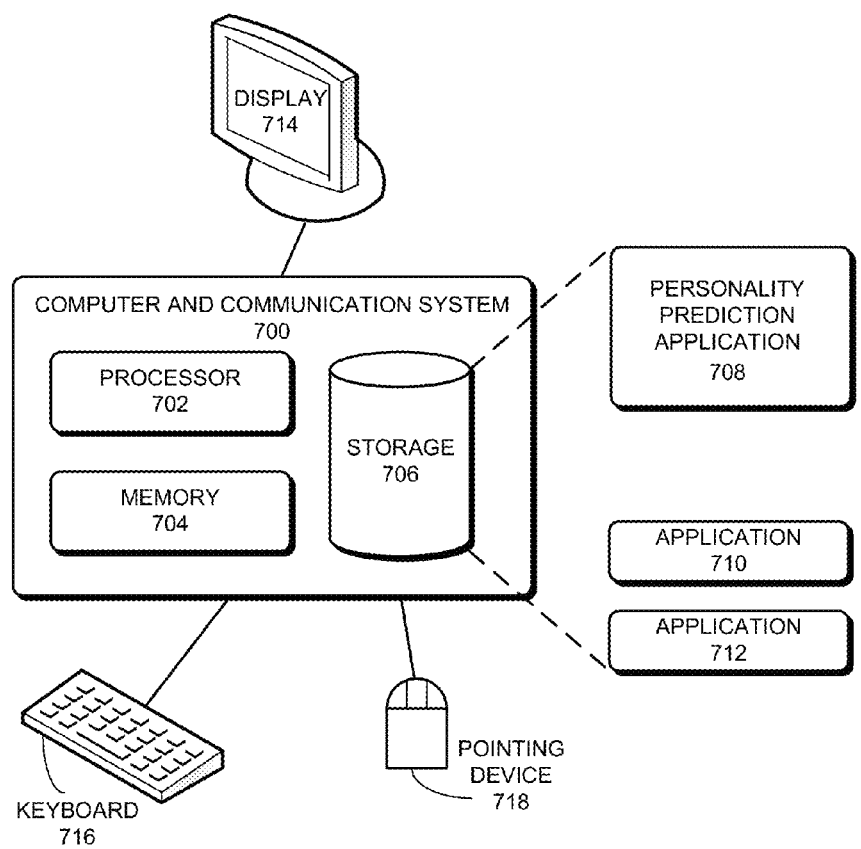
FIG. 7 illustrates an exemplary computer system for predicting personality, in accordance with one embodiment of the present invention.

FIG. 7 illustrates an exemplary computer system for predicting personality, in accordance with one embodiment of the present invention. In one embodiment, a computer and communication system 700 includes a processor 702, a memory 704, and a storage device 706. Storage device 706 stores a personality prediction application 708, as well as other applications, such as applications 710 and 712. During operation, the personality prediction application 708 is loaded from storage device 706 into memory 704 and then executed by processor 702. While executing the program, processor 702 performs the aforementioned functions. Computer and communication system 700 is coupled to an optional display 714, keyboard 716, and pointing device 718.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for predicting a personality trait, the method comprising:
   obtaining personality data associated with users;
   collecting sample data associated with the users, wherein the sample data includes text data;
   training a predictor with the collected sample data and the personality data, wherein training the predictor comprises referencing a sentiment dictionary and counting a number of words in the text data with positive sentiment;
   collecting data associated with a particular user; and
   generating a personality trait score for the particular user by using the predictor to analyze the particular user's collected data.

2. The method of claim 1, wherein the text data includes one or more of a character name associated with an online game, a username associated with an online account, a writing sample, or an e-mail address.

3. The method of claim 1, wherein training the predictor further comprises collecting social data; and training the predictor based on the collected social data.

4. The method of claim 3, wherein the social data includes a social network graph constructed by analyzing one or more of e-mail communication, chat history, and/or participation in game guilds.

5. The method of claim 1, wherein training the predictor further comprises collecting behavior data; and training the predictor based on the collected behavior data.

6. The method of claim 5, wherein the behavior data includes one or more of achievement ratio, activity logs from an online game, behavior data from an online dating service, and/or work pattern data of the user.

7. The method of claim 1, further comprising combining personality trait scores from multiple predictors to generate an overall personality trait score.

8. The method of claim 1, wherein training the predictor further comprises collecting text, social, and/or behavior data; and training the predictor based on the collected text, social, and/or behavior data.

9. A computing system for predicting a personality trait, the system comprising:
   one or more processors,
   a computer-readable medium coupled to the one or more processors having instructions stored thereon that, when executed by the one or more processors, cause the one or more processors to perform operations comprising:
   obtaining personality data associated with users;
   collecting sample data associated with the users, wherein the sample data includes text data;
   training a predictor with the collected sample data and the personality data, wherein training the predictor comprises referencing a sentiment dictionary and counting a number of words in the text data with positive sentiment;
   collecting data associated with a particular user; and
   generating a personality trait score for the particular user by using the predictor to analyze the particular user's collected data.

10. The computing system of claim 9, wherein the text data includes one or more of a character name associated with an online game, a username associated with an online account, a writing sample, or an e-mail address.

11. The computing system of claim 9, wherein training the predictor further comprises collecting social data; and training the predictor based on the collected social data.

12. The computing system of claim 11, wherein the social data includes a social network graph constructed by analyzing one or more of e-mail communication, chat history, and/or participation in game guilds.

13. The method of claim 9, wherein training the predictor further comprises collecting behavior data; and training the predictor based on the collected behavior data.

14. The computing system of claim 13, wherein the behavior data includes one or more of achievement ratio, activity logs from an online game, behavior data from an online dating service, and/or work pattern data of the user.

15. The computing system of claim 9, wherein the computer-readable storage medium stores additional instructions that, when executed, cause the one or more processors to perform additional steps comprising:
   combining personality trait scores from multiple predictors to generate an overall personality trait score.

16. The computing system of claim 9, wherein training the predictor further comprises collecting text, social, and/or behavior data; and training the predictor based on the collected text, social, and/or behavior data.

17. A non-transitory computer-readable storage medium storing instructions that when executed by a computer cause the computer to perform a method for predicting a personality trait, the method comprising:
   one or more processors;
   a computer-readable medium coupled to the one or more processors having instructions stored thereon that, when executed by the one or more processors, cause the one or more processors to perform operations comprising:
   obtaining personality data associated with users;
   collecting sample data associated with the users, wherein the sample data includes text data;
   training a predictor the collected sample data and the personality data, wherein training the predictor comprises referencing a sentiment dictionary and counting a number of words in the text data with positive sentiment;
   collecting data associated with a particular user; and
   generating a personality trait score for the particular user by using the predictor to analyze the particular user's collected data.

18. The non-transitory computer-readable storage medium of claim 17, wherein the text data includes one or more of a character name associated with an online game, a username associated with an online account, a writing sample, or an e-mail address.

19. The non-transitory computer-readable storage medium of claim 17, wherein training the predictor further comprises collecting social data; and training the predictor based on the collected social data.

* * * * *

UNITED STATES PATENT AND TRADEMARK OFFICE
CERTIFICATE OF CORRECTION

PATENT NO. : 9,015,088 B2
APPLICATION NO. : 13/663747
DATED : April 21, 2015
INVENTOR(S) : Jianqiang Shen et al.

It is certified that error appears in the above-identified patent and that said Letters Patent is hereby corrected as shown below:

Title Page
The Assignee should read "Palo Alto Research Center Incorporated", please change "Incorported" to "Incorporated"

Signed and Sealed this
Twenty-third Day of February, 2016

Michelle K. Lee
*Director of the United States Patent and Trademark Office*

UNITED STATES PATENT AND TRADEMARK OFFICE
CERTIFICATE OF CORRECTION

PATENT NO. : 9,015,088 B2  
APPLICATION NO. : 13/663747  
DATED : April 21, 2015  
INVENTOR(S) : Jianqiang Shen et al.

Page 1 of 1

It is certified that error appears in the above-identified patent and that said Letters Patent is hereby corrected as shown below:

Title Page

Item 73 the Assignee should read "Palo Alto Research Center Incorporated", please change "Incorported" to "Incorporated"

This certificate supersedes the Certificate of Correction issued February 23, 2016.

Signed and Sealed this  
Seventh Day of June, 2016

Michelle K. Lee  
*Director of the United States Patent and Trademark Office*